United States Patent Office 3,468,777
Patented Sept. 23, 1969

3,468,777
IRRADIATED INSOLUBLE AMYLOSE STARCH
Henry G. Schirmer, Spartanburg, S.C., assignor to
W. R. Grace & Co., Duncan, S.C., a corporation
of Connecticut
Filed May 14, 1965, Ser. No. 455,771
Int. Cl. C08b 1/00
U.S. Cl. 204—160.1          4 Claims

ABSTRACT OF THE DISCLOSURE

This invention is directed to an irradiated starch with an increased insolubility and a high amylose content having at least about 20 percent insolubles in boiling water and 20 percent amylose and prepared by intimately contacting the starch with water to increase its moisture content and irradiating to a dosage of less than 10 megarads, all as further described herein.

---

Figure 1:
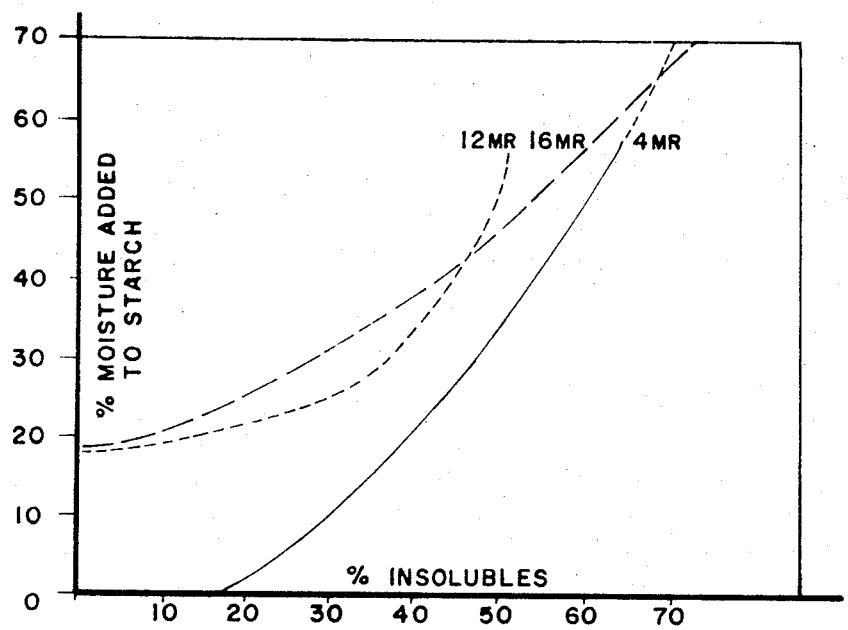

This invention relates to starch having a high amylose content. In one aspect, the invention relates to a method for treating a starch having a high amylose content. In another aspect, the invention relates to increasing the insolubility in boiling water of amylose starch.

Starch is a mixture of high molecular weight natural polymers and may be obtained from a number of sources such as potato, tapioca, and corn. The mixture is essentially 2 fractions: amylose, a straight chain linear fraction and amylopectin, a branched chain fraction. Both fractions are polysaccharides consisting of d-glucopyranose units combined by 1-4 alpha linkages. Due to these differences in molecular structure, there are vast differences in the amylose and amylopectin fractions. In general, the amylopectin is soluble in water and the amylose is insoluble in cold water, but soluble in boling water.

Each of the fractions have uses which make them of interest for commercial applications, particularly where a soluble film is to be used; however, the amylose is generally most useful and a number of attempts have been made and are still being made to produce a corn which has a naturally high amylose content that is above 85%; however, these starches are still highly soluble in boiling water even though they may be substantially insoluble in cold water.

It is an object of the invention to provide a starch which is insoluble in boiling water.

It is another object of the invention to provide a method for increasing the insolubility in boiling water of starch.

It is another object of the invention to provide a method for treating a film prepared from starch having a high amylose content to increase its insolubility in boiling water.

These and other objects of the invention will be readily apparent to those skilled in the art from the following description and appended claims.

It has now been surprisingly found that if starch having a high amylose content is first intimately contacted with water and then irradiated to a dosage of less than 10 megarads that the resultant starch contains an increased proportion of material which is insoluble in boiling water. This is most surprising since it is known in the art that irradiation of amylose starch to a dosage of 10 to 100 megarads (mr.) results in a product which is more soluble. (British Patent No. 832,746).

This invention is broadly applicable to starch from whatever source derived having a high amylose content. Preferably, the starch contains at least 60 percent, more preferably 80 to 100 percent, amylose. The high amylose content starch may be obtained from any suitable source such as fractionation of starch and starch naturally containing amylose content. The amylosic material may be relatively pure amylose, derivatives of amylose such as hydroxyethyl amylose or high amylose starch and mixtures thereof. In general, starch is hygroscopic and will retain or regain up to about 10 weight percent moisture.

The starch may be employed in any suitable form or structure such as films, filaments or other elongated members. For simplicity, the invention will be described with reference primarily to films but is not to be so limited. The films may be prepared from amylosic materials by casting a solution of the material in a solvent onto a suitable surface and then peeling the resultant gel from the surface. Film may also be prepared by extruding a plasticized amylosic material. If the amylosic material is to be extruded, it is generally preferred to combine it with a compatible plasticizer to provide a pseudo thermoplastic composition and then extrude the composition. Suitable plasticizers include the polyhydric alcohols, with glycerine being preferred, and the invert sugars, corn syrup, d-sorbitol and hydroxypropyl glycerine. The selection of suitable extrusion compositions and conditions are well within the skill of the art; for example, a suitable composition for extrusion would include 50–70 weight percent amylosic material, 0–29 weight percent plasticizer and 20–50 weight percent water. The liquid and dry materials are admixed by any suitable means such as by a blade mixer, a Muller type mixer or a twin shell blender.

Although it is known to employ water to plasticize the extrusion mixture, the water escapes from the hot extrudate and during subsequent drying so that the starch contains very little moisture although there is some regain of moisture to about 10 percent. It is, therefore, surprising to discover that if a starch having a high water content is irradiated with a dosage of less than 10 megarads that the gel content (weight percent insolubles in boiling water) is increased. The water may be added to the film after drying or the water may be added prior to extrusion or casting. Preferably, the water content of the starch immediately prior to irradiation is at least 10 percent, more preferably in the range of 20 to 70 weight percent. The film may be sprayed with water, dipped in water or otherwise intimately contacted with water. Apparently, the film absorbs the water. After irradiation the moisture is lost due to evaporation or drying to about 10 weight percent. After irradiation the gel content (insolubles in boiling water) is increased, preferably to at least 20 weight percent, more preferably to a range of 30 to 70 weight percent based on the irradiated sample weight.

The films or other structures prepared by the method of this invention are particularly useful as wrapping material for sausages and meats or packages of frozen vegetables or other refrigerated foods. In general, the film is used in substantially any manner employing other films prepared from potato starch, methylcellulose and carboxymethylcellulose. In the non-food packaging field, polyvinyl alcohol and polyethylene oxide films are competitors.

The invention is best described with reference to the following example.

A film having thickness of about 3 mils and prepared by casting (extruding or casting) corn starch was sprayed with water at room temperature. The starch had a particle size of 10–100 microns and contained about 10 percent moisture. On a dry basis, the starch contained about 97 percent starch carbohydrates including 90 percent amylose. The starch was substantially soluble in boiling water and was 95 percent soluble in cold water. The starch had a density of 1.46 g./cc. at 25° C. (as determined from the technical sheet for Napol "L" starch by A. E. Staley, Decatur, Ill.).

Different samples were sprayed with different amounts of water so that the amount of water added varied from 0 to about 60 weight per cent of the original weight of the film. The respective samples were then irradiated with electrons to dosages of from 0-4 MR and the actual moisture content of the irradiated sample after drying was then determined as well as the per cent insoluble material in boiling water. These results are shown in the following table and are further depicted in FIGURES 1 and 2 attached.

TABLE I

| Sample No.: | Water Added, percent [1] | Irradiation Dosage, Megarads | Insolubles, percent [2] |
|---|---|---|---|
| 1 | 29.7 | 12 | 36.9 |
| 2 | 30.2 | 4 | 47.5 |
| 3 | 18.5 | 12 | 0 |
| 4 | 36.8 | 16 | 37.9 |
| 5 | 22.4 | 4 | 42.1 |
| 6 | 9.4 | 8 | 0 |
| 7 | 21.6 | 16 | 15.0 |
| 8 | 15.7 | 12 | 0 |
| 9 | 20.2 | 20 | 17.9 |
| 10 | 19.4 | 8 | 32.9 |
| 11 | 57.6 | 4 | 63.2 |
| 12 | 48.1 | 8 | 57.0 |
| 13 | 55.8 | 12 | 50.4 |
| 14 | 57.2 | 16 | 60.8 |
| 15 | 0 | 4 | 16.2 |
| 16 | 0 | 8 | 17.9 |
| 17 | 0 | 12 | 0 |
| 18 | 0 | 16 | 0 |
| 19 | 0 | 20 | 0 |
| 20 | 0 | 40 | 5.5 |
| 21 | 0 | 0 | 0 |

[1] Based on original film weight.
[2] In boiling water, based on irradiated sample weight (average of two samples).

FIGURE 1 is a plot of the data in the table and illustrates that the per cent insoluble material is increased as the percent water added to the film is increased.

Figure 2:
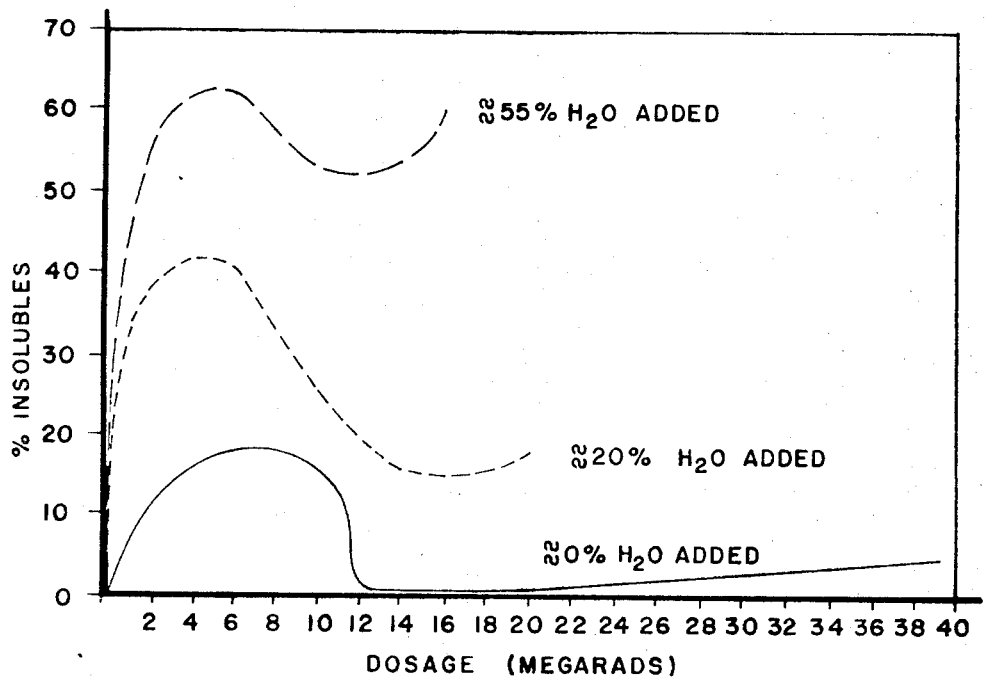

FIGURE 2 was prepared from the curves of FIGURE 1 and dramatically points out the surprising fact that there is a critical range for dosage in which insolubility is increased.

These data demonstrate that if no water is added to the film prior to irradiation the per cent gel is a maximum of about 18 at 6 MR. However, if only 20 percent water is added then the percent of gel is increased to a maximum of about 40 percent at 4 MR and at 55 percent water the gel is increased to a maximum of about 62 percent at about 5 MR. In each case as the amount of irradiation is increased the percent gel is drastically reduced after the peak has been reached.

A REP as recognized in the art is defined as that amount of nuclear irradiation which dissipates 93 ergs of energy per gram of tissue producing $1.61 \times 10^{12}$ ion pairs in the process. An alternative unit is the rad which is defined as representing 100 ergs of energy per gram imparted by ionizing particles to the irradiated material at the point of interest, Glasstone Principles of Nuclear Reactor Engineering (1955), page 547.

The polymer is generally subjected to irradiation at ambient temperatures with the reduction in solubility proceeding more rapidly at elevated temperature.

The web or film or filament may be of any suitable dimensions so long as the irradiation is effective for reducing solubility of the polymer unit.

Irradiation can be accomplished by various methods. Thus, there can be used electrons, X-rays, gamma rays, by employing iron 59 or cobalt 60, beta rays, e.g., by employing cobalt 60, carbon 14, phosphorus 32, strontium 90, and ultra-violet light. Preferably, electrons of at least $10^5$ electron volts energy are employed. A suitable irradiation source is a Van de Graaff type electron accelerator manufactured by the High Voltage Engineering Corporation, Burlington, Mass., operated at 2,000,000 volts and a power output of 500 watts. Alternatively, there can be employed other sources of high energy electrons, such as the General Electric 2,000,000 volt, 10 kw., resonant transformer unit or the corresponding 1,000,000 volt, 5 kw., General Electric resonant transformer or a linear accelerator.

The time of irradiation is not critical but need merely be sufficient to give a dosage of sufficient REP. The voltage, likewise, can be varied quite widely, but for rapid irradiation of thick or multi-layer materials is desirably high, e.g., 750,000 to 1,000,000 or 2,000,000 or 3,000,000 or 6,000,000 volts, or even higher. By appropriate combination of time of treatment, voltage and beam current, the desired dosage is obtained.

Preferably, the irradiation dosage is less than 10 megarads (mr.), more preferably, in the range of 2 to 8 mr.

While certain examples, structures, composition and process steps have been described for purpose of illustration, the invention is not limited to these. Variation and modification within the scope of the disclosure and the claims can readily be effected by those skilled in the art.

I claim:

1. A starch having an increased insolubility and a high amylose content comprising an irradiated starch having at least about 20 percent insolubles in boiling water and at least about 20 percent amylose, said starch being prepared by intimately contacting said starch with water to increase its moisture content and irradiating the resultant starch to a dosage of less than 10 megarads.

2. The starch of claim 1 wherein the boiling water insolubles content is 30-70 percent and the amylose content is 80-100 percent and the starch is prepared by raising the moisture content to 20-70 percent by intimately contacting said starch with water and then the resultant starch is irradiated to a dosage in the range of 2-8 megarads.

3. The starch of claim 1 wherein the starch is an elongated member.

4. The starch of claim 1 wherein the starch is a film.

References Cited

FOREIGN PATENTS 871,634  8/1959  Great Britain.
832,746  11/1955  Great Britain.

MURRAY TILLMAN, Primary Examiner

R. B. TURER, Assistant Examiner

U.S. Cl. X.R.

106—162; 219—68; 260—233.3